(12) United States Patent
Lai

(10) Patent No.: US 8,294,971 B2
(45) Date of Patent: Oct. 23, 2012

(54) APPARATUS COMPRISING AN OPTICAL PATH DELAY SCANNER

(75) Inventor: Ming Lai, Webster, NY (US)

(73) Assignee: Bausch • Lomb Incorporated, Rochester, NY (US)

( * ) Notice: Subject to any disclaimer, the term of this patent is extended or adjusted under 35 U.S.C. 154(b) by 691 days.

(21) Appl. No.: 12/338,100

(22) Filed: Dec. 18, 2008

(65) Prior Publication Data
US 2010/0157403 A1    Jun. 24, 2010

(51) Int. Cl.
G02B 26/08    (2006.01)
(52) U.S. Cl. .............. 359/211.3; 359/211.2; 359/900
(58) Field of Classification Search .... 359/211.1–211.6, 359/831, 833–836, 201.1, 203.1
See application file for complete search history.

(56) References Cited

U.S. PATENT DOCUMENTS

| | | | |
|---|---|---|---|
| 4,319,807 A * | 3/1982 | Horton | 359/211.1 |
| 4,544,228 A * | 10/1985 | Rando | 359/211.1 |
| 4,697,882 A * | 10/1987 | Sato et al. | 359/640 |
| 4,869,593 A | 9/1989 | Biegen | |
| 4,938,584 A | 7/1990 | Suematsu et al. | |
| 5,042,938 A | 8/1991 | Shimozono | |
| 5,141,302 A | 8/1992 | Arai et al. | |
| 5,272,325 A * | 12/1993 | Peng | 235/462.35 |
| 5,280,313 A | 1/1994 | Kohayakawa | |
| 5,282,852 A | 2/1994 | Capetan et al. | |
| 5,301,010 A | 4/1994 | Jones et al. | |
| 5,347,327 A | 9/1994 | Sekine et al. | |
| 5,387,951 A | 2/1995 | Hatanaka | |
| 5,633,694 A | 5/1997 | Mihashi et al. | |
| 5,673,096 A | 9/1997 | Dorsel et al. | |
| 5,719,673 A | 2/1998 | Dorsel et al. | |
| 5,847,827 A | 12/1998 | Fercher | |
| 5,870,191 A | 2/1999 | Shirley et al. | |
| 5,973,781 A | 10/1999 | Moeller et al. | |
| 5,975,699 A | 11/1999 | Hellmuth | |
| 6,053,613 A | 4/2000 | Wei et al. | |
| 6,057,920 A | 5/2000 | Fercher et al. | |
| 6,144,456 A | 11/2000 | Chavanne et al. | |
| 6,243,191 B1 | 6/2001 | Fercher | |
| 6,384,945 B1 | 5/2002 | Hakimi et al. | |
| 6,407,872 B1 | 6/2002 | Lai et al. | |

(Continued)

FOREIGN PATENT DOCUMENTS
EP    0956809 A1    11/1999
(Continued)

OTHER PUBLICATIONS

Ballif et al., "Rapid and scalable scans at 21 m/s in optical low-coherence reflectometry," Optics Letters, (vol. 22), (Issue. 11), (p. 757-759), (Jun. 1, 1997).

(Continued)

Primary Examiner — James Phan
(74) Attorney, Agent, or Firm — Jeffrey B. Powers (57) ABSTRACT

An optical path delay scanner, comprising a rotatable mount, a first prism and a second prism disposed on the mount, and a radiation source aligned to project light through the first prism and the second prism. The radiation source may be arranged to project the light on a surface of the first prism at an incidence angle corresponding to the prism's minimum deviation angle. The scanner may be disposed in a reference arm of a Michaelson interferometer.

16 Claims, 5 Drawing Sheets

U.S. PATENT DOCUMENTS

| | | |
|---|---|---|
| 6,601,956 B1 | 8/2003 | Jean et al. |
| 6,724,487 B2 | 4/2004 | Marcus et al. |
| 6,779,891 B1 | 8/2004 | Barth et al. |
| 7,016,046 B2 | 3/2006 | Hauger |
| 7,079,255 B2 | 7/2006 | Fercher |
| 7,084,986 B2 | 8/2006 | Hellmuth et al. |
| 7,246,905 B2 | 7/2007 | Benedikt et al. |
| 2002/0163623 A1 | 11/2002 | Hirohara et al. |
| 2004/0061830 A1 | 4/2004 | Hellmuth et al. |
| 2004/0070730 A1 | 4/2004 | Mihashi et al. |
| 2005/0140981 A1 | 6/2005 | Waelti |
| 2005/0203422 A1 | 9/2005 | Wei |
| 2006/0146334 A1 | 7/2006 | Cluff et al. |
| 2007/0291276 A1 | 12/2007 | Fercher |
| 2009/0296229 A1* | 12/2009 | Towner et al. ............ 359/669 |

FOREIGN PATENT DOCUMENTS

| | | |
|---|---|---|
| GB | 2370877 A | 7/2002 |
| JP | 2297332 A | 12/1990 |
| WO | WO 83/03684 A1 | 10/1983 |
| WO | WO 93/20743 A1 | 10/1993 |
| WO | WO 03/002936 A1 | 1/2003 |
| WO | WO 03/052345 A1 | 6/2003 |
| WO | WO 03/077739 A2 | 9/2003 |
| WO | WO 2004/057266 A2 | 7/2004 |
| WO | WO 2005/060823 A1 | 7/2005 |
| WO | WO 2005/074789 A1 | 8/2005 |
| WO | WO 2005/114094 A1 | 12/2005 |
| WO | WO 2006/081988 A1 | 8/2006 |
| WO | WO 2006/081998 A1 | 8/2006 |

OTHER PUBLICATIONS

Lai, "Eye Length Measurement Apparatus," U.S. Appl. No. 11/954,146, (Dec. 11, 2007).

Youssefi et al., "Ophthalmic Instrument Alignment Apparatus and Method of Using Same," U.S. Appl. No. 12/334,896, (Dec. 15, 2008).

Chin B. Su, "Achieving variation of the optical path length by a few millimeters at millisecond rates for imaging of turbid media and optical interferometry: a new technique," Opt. Lett. 22, 665-667 (1997).

* cited by examiner

APPARATUS COMPRISING AN OPTICAL PATH DELAY SCANNER

FIELD OF INVENTION

The present invention relates to methods and apparatus to delay an optical beam.

BACKGROUND OF THE INVENTION

The need to delay an optical beam in a repeatable manner is known. Apparatus for achieving such delay are commonly referred to as optical path delay scanners (or simply "delay scanners"). For example, a scanner may be used to control the phase of one beam of light relative to another beam of light. Such techniques find applications in fields of detection and measurement, among other fields.

For example, delay scanners are used for axial eye length measurements based on Michaelson interferometer arrangements. Generally, such apparatus include a beam splitter that 1) projects partially coherent light into a test arm onto a subject's eye, and 2) projects partially coherent light into a reference arm onto a moveable mirror. By moving the mirror a known amount and measuring an output including a combination of light reflected from the eye and from the mirror, portions of the output that are influenced by interference of light reflected from the eye and light from the mirror can be identified, and various eye lengths can be measured.

Figure 1:
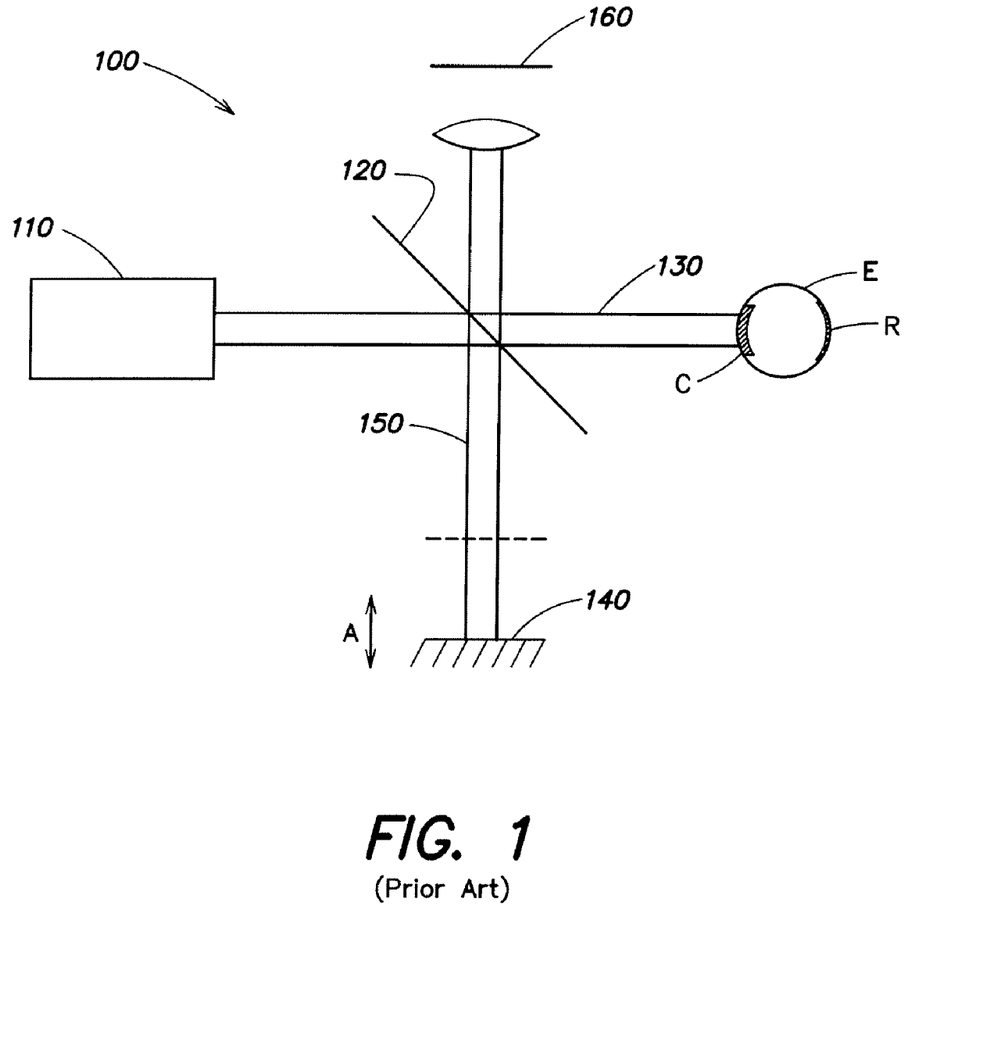
FIG. 1 illustrates a conventional eye length measurement apparatus in which light from a source is projected onto a beam splitter which projects light onto an eye in a test arm and onto a scanning mirror in the reference arm.

Numerous apparatus have been designed to implement such eye length measurement techniques. FIG. 1 illustrates an example of a conventional apparatus 100 in which light from a source 110 is projected onto a beam splitter 120 which projects light onto an eye E in a test arm 130 and onto a scanning minor 140 in a reference arm 150 to delay light in the reference arm relative to the test arm (as shown by arrow A).

An output signal from a detector 160 is generated by the combined reflections from the eye and mirror. The amplitude of the signal will increase and decrease due to interference (i.e., interference spikes will arise) when the length of the reference arm is within a distance equal to the coherence length of the light (as determined by the source) of a length in the test arm. A length of the test arm is determined by a reflective surface in the eye (e.g., a surface of the cornea or a surface of the retina). The amount which the mirror is moved between a location to achieve an interference output for a first surface (e.g., a surface of the cornea) and a location to achieve an interference output for a second surface (e.g., a surface of the retina) indicates the distance between the first surface and the second surface. An eye's overall axial length can be measured in this manner.

In apparatus as illustrated in FIG. 1, it is desirable that the delay in the reference arm (i.e., as caused by movement of mirror 140) occur in a highly linear manner. The linearity preferably is present over a substantial length (e.g., 15-35 mm) to obtain accurate eye length measurements. Because the mirror must be slowed in order to stop and reverse direction of the mirror, linearity at the end of the range may be insufficient. Additionally, because the mirror must be stopped and its direction reversed, there may be trade-offs between the repetition rate, duty cycle, delay magnitude and/or linearity that are achievable.

The time required to move the mirror can be substantial, particularly if multiple measurements of a given patient's eye length are to be made and averaged together. As a result, eye movement during measurement can be a source of error. While the speed of mirror movement can be increased, a drawback of increased speed is increased wear, vibration, and noise arising due to the stopping and starting of mirror movement.

SUMMARY

Aspects of the present invention are directed to an optical path delay scanner, comprising a rotatable mount, a first prism and a second prism disposed on the mount, and a radiation source aligned to project a beam of light through the first prism and the second prism.

In some embodiments, the mount is adapted to rotate about an axis, and wherein the first prism and the second prism are disposed on the mount such that if the mount is rotated 180 degrees about the axis, the arrangement of the first prism and the second prism is indistinguishable from the positioning prior to the rotation.

In some embodiments, the first prism and the second prism are both isosceles prisms. In some embodiments, the first prism and the second prism are substantially identically configured isosceles prisms.

A surface of the first prism may be parallel to a surface of the second prism, the surfaces being surfaces through which the beam passes.

In some embodiments, the radiation source is arranged to project the beam on a surface of the first prism at an incidence angle corresponding to the prism's minimum deviation angle. In some embodiments, the incidence angle of the beam on the surface of the first prism does not depart from the incidence angle corresponding to the minimum deviation by more than +/−25 degrees across the surface as the mount is rotated.

The scanner may further comprise a reflective component arranged to reflect the beam back through the first prism and second prism after the beam has passed through the first prism and the second prism. The scanner may further comprise a third prism and a fourth prism disposed on the mount, the radiation source aligned to project a beam of light through the third prism and the fourth prism when the mount is rotated.

In some embodiments, the scanner further comprises a roof prism and a reflective element configured and arranged to cause the beam to traverse the first prism and the second prism four times. The scanner may be disposed in a reference arm of a Michaelson interferometer.

Another aspect of the invention is directed to a method of providing an optical delay, comprising projecting a beam of light through a first prism and a second prism, while the first prism and the second prism are rotating about a common axis.

In some embodiments, the first prism and the second prism are both isosceles prisms. The first prism and the second prism may be substantially identically configured isosceles prisms.

In some embodiments, a surface of the first prism is parallel to a surface of the second prism, wherein the beam passes through both the surface of the first prism and the surface of the second prism.

In some embodiments, the step of projecting comprises projecting the beam on a surface of the first prism at an incidence angle corresponding to the prism's minimum deviation angle. In some embodiments, the step of projecting comprises projecting the beam on the surface of the first prism such that the incidence angle of the beam on the surface does not depart from the incidence angle corresponding to the minimum deviation by more than +/−25 degrees across the surface as the prisms are rotated.

In some embodiments, the method further comprises reflecting the beam back through the first prism and second prism after the beam has passed through the first prism and the second prism.

BRIEF DESCRIPTION OF THE DRAWINGS

Illustrative, non-limiting embodiments of the present invention will be described by way of example with reference to the accompanying drawings, in which the same reference number is used to designate the same or similar components in different figures, and in which.

DETAILED DESCRIPTION

Figure 2A:
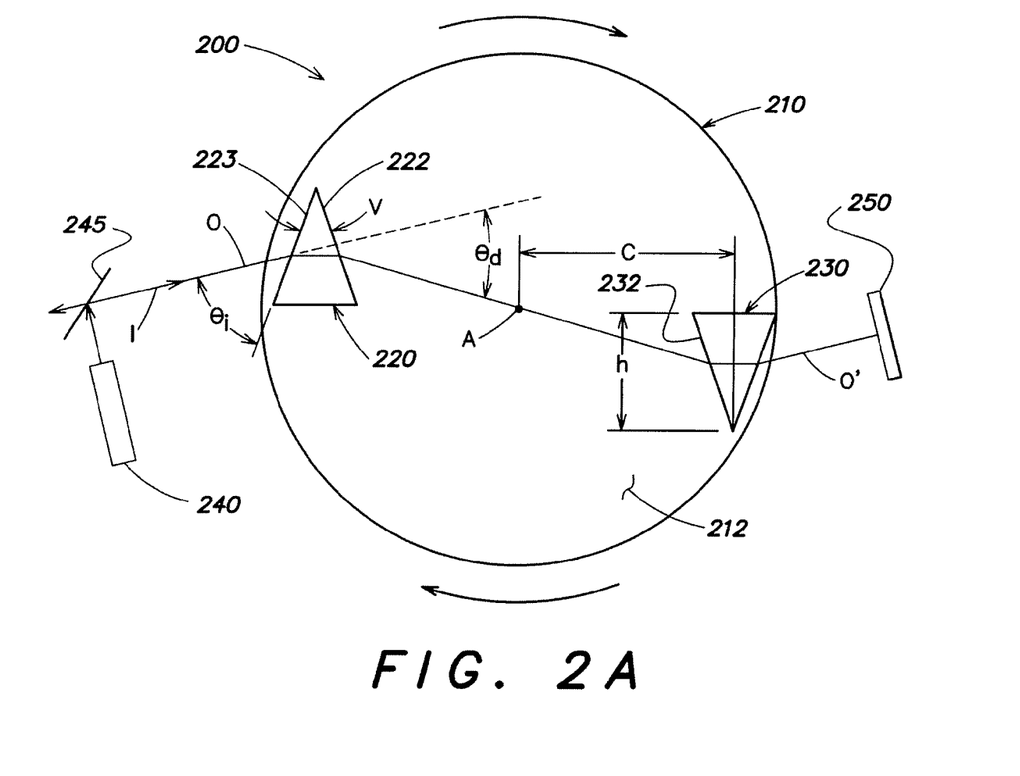
FIG. 2A is a schematic, plan view of an example of an optical path delay scanner according to aspects of the present invention.

FIG. 2A is a schematic, plan view illustration of an example of an optical path delay scanner 200 according to aspects of the present invention. Scanner 200 comprises a rotatable mount 210 adapted to rotate about an axis A, a first prism 220 disposed on the mount, a second prism 230 disposed on the mount, and a radiation source 240.

The radiation source is aligned relative to the first prism and the second prism so that a beam of light can be projected through the first prism and the second prism. In the illustrated embodiment, a beam splitter 245 is included to separate input beam I from output beam O; however, any suitable technique for providing an input beam may be used. The radiation source may be coherent source (e.g., a laser) adapted to project a coherent beam through the prisms or a partially coherent source such as a superluminescent diode adapted to project a partially coherent beam through the prisms.

Typically, first prism 220 and the radiation source 240 are aligned so that light emerging from the prism passes through or proximate to rotational axis A of the mount and is perpendicular thereto. It will be appreciated that some deviation of the beam from the rotational axis may occur during rotation of the mount due the non-linear movement (i.e., rotation about axis A) of the prism and/or limitation in positioning of the optical components of the system.

Figure 2B:
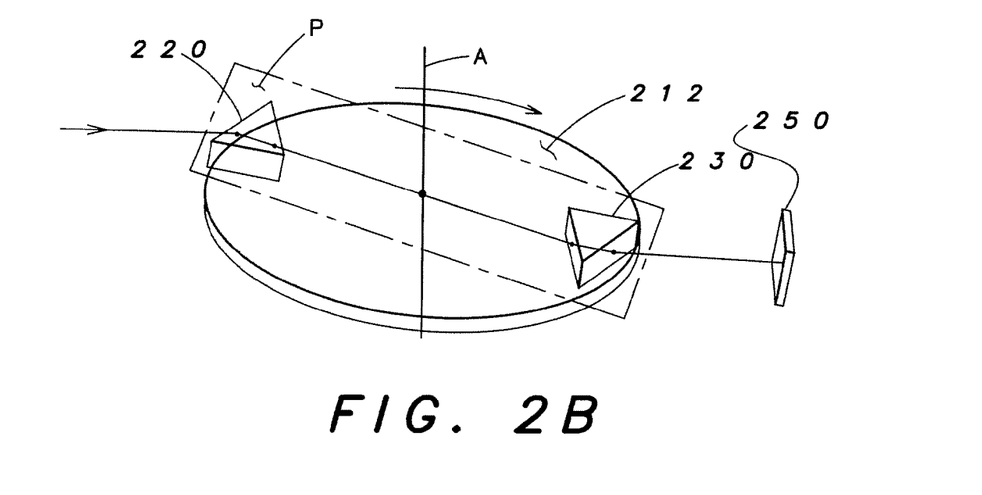
FIG. 2B is a schematic, projection view of the optical path delay scanner of FIG. 2A.

In the illustrated embodiment, first prism 220 and second prism 230 are disposed on the mount such that, when the mount is rotated 180 degrees about the rotational axis, the first prism and the second prism exchange positions. That is to say, the first prism and the second prism are disposed on the mount such that if the mount is rotated 180 degrees about the axis, the arrangement of the first prism and the second prism is indistinguishable from the positioning prior to the rotation. In some embodiments, the second prism is disposed anti-symmetrically of the first prism about the rotational axis. As shown in FIG. 2B, it will be appreciated that it is typically desirable that such indistinguishability and/or anti-symmetry occurs in a plane P that is perpendicular to the rotational axis and that includes the beam.

In the illustrated embodiment, the first prism and the second prism are substantially identically configured isosceles prisms. Additionally, the prisms are disposed such that a surface 222 (the surface nearest axis A) of the first prism is parallel to a surface 232 (the surface nearest axis A) of the second prism. It will be appreciated that the prisms need not be identical. It will also be appreciated that portions of the prisms not in a plane that is perpendicular to the rotational axis and that includes the input beam are insignificant to the optical performance of the scanner.

Preferably, mount 210 is rotatable at a uniform angular speed. Typically, a mount surface 212, on which the first prism and the second prism are coupled, is maintained in a plane during the rotation. For example, the mount may be coupled to an axle (not shown) through which rotational axis A extends. A motor (not shown) can be coupled to the axle to rotate the mount.

It is typically advantageous if radiation source 240 is aligned to project light onto first surface 223 of first prism 220, such that for at least one location on the surface, the light is projected at an incidence angle $\theta_i$ that is selected to achieve the prism's minimum deviation angle $\alpha$. At such an incidence angle, the input angle $\theta_i$ is said to "correspond to the minimum deviation angle." Typically, as prism 220 is rotated, the light projected onto first surface 223 will be at such an incidence angle for only one or some locations on which the beam is projected. The term "minimum deviation angle" is understood to mean the minimum angular deviation $\theta_d$ of the beam exiting first prism 220 (as measured relative to the input beam) that is achievable for any incidence angle $\theta_i$.

Figure 3:
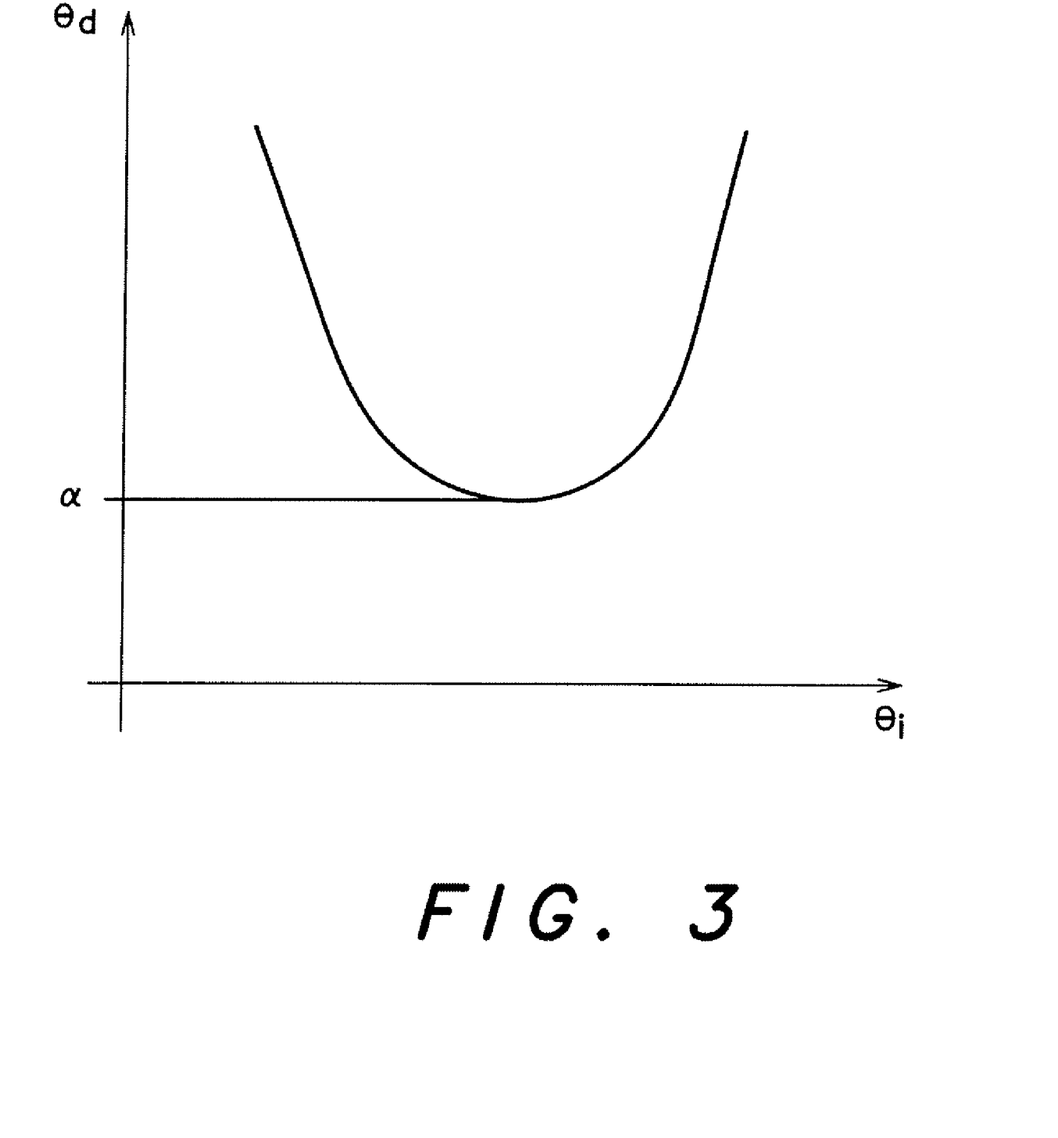
FIG. 3 is an approximate graphical representation of the deviation of the output beam relative to the input beam as a function of the angle of incidence of the input beam on a surface of the prism.

The minimum deviation angle for an isosceles prism is determined by magnitude of the vertex angle V and the index of the material of which the prism is made. It will be appreciated that a change in incident angle will occur during rotation of the mount due the non-linear (e.g., rotational) movement of the prism and limitation in positioning of the optical components of the system. However, as shown in FIG. 3, an advantage of projecting light through the first prism at or close to an incidence angle $\theta_i$ corresponding to the minimum deviation angle $\alpha$ is that variability of the angle of the beam exiting from the first prism is relatively small for any given change in incidence angle $\theta_i$ thereby permitting 1) the beam incident on surface 232 of the second prism to be controlled and 2) linearity of the phase delay of output beam O to be improved.

In some embodiments, the incidence angle $\theta_i$ of the light projected on the first prism does not depart from the incidence angle corresponding to the minimum deviation by more than +/−25 degrees across the surface (i.e., for any location on first surface 223 on which the beam of light is incident) as the mount is rotated. In some embodiments, the incidence angle $\theta_i$ of the light projected on the first prism does not depart from the incidence angle corresponding to the minimum deviation by more than +/−20 degrees across the surface as the mount is rotated. In some embodiments, the incidence angle $\theta_i$ of the light projected on the first prism does not depart from the incidence angle corresponding to the minimum deviation by more than +/−15 degrees across the surface as the mount is rotated.

In the illustrated embodiment, a reflective component 250 is present to reflect the beam so that the output beam O exits the scanner on the same surface 223 of the first prism as the beam enters the first prism from radiation source 240. However, it will be appreciated that the reflective component may be omitted such that the output beam O' exist the scanner though the second prism. It will also be appreciated that, in embodiments where a reflective component is present, the beam O' incident on the reflective component will move laterally across reflective component 250 as mount 210 is rotated. Accordingly, if the reflective component is omitted, the output beam O' will move laterally as the mount is rotated; however the output will still have a variable phase. It will also be appreciated that, if reflective component 250 is included, the beam traverses prisms 220, 230 twice and therefore the phase delay achieved by the scanner is double that which is achieved without the reflective component. If reflective component 250 is included, the output beam O will be coincident or substantially coincident with the input beam I.

In one embodiment of the delay scanner, each prism has a vertex angle V=40 degrees. The prism height h=28 mm, and the prism is made of glass having an index of refraction of 1.677. The distance of the center of the prisms C to rotational axis of the wheel is 50 mm. Calculations have shown that such a configuration can achieve delays in a range of about 0-20 mm.

Figure 4:
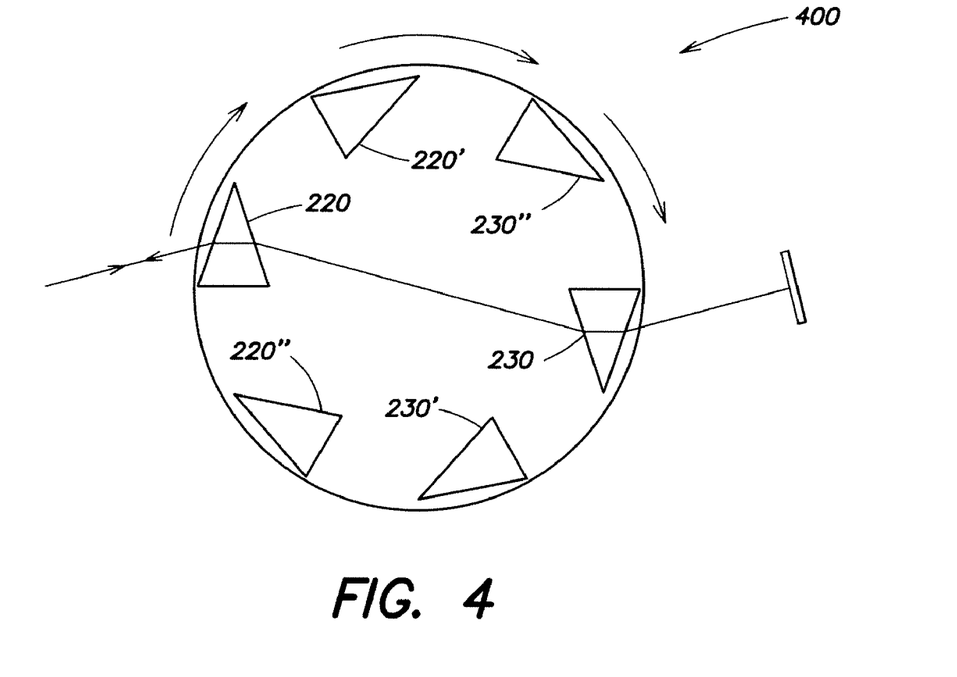
FIG. 4 is a schematic, plan illustration of another embodiment of delay scanner according aspects of the present invention.

FIG. 4 is a schematic plan illustration of anther embodiment of a delay scanner 400 according aspects of the present invention. Delay scanner 400 includes three pairs of prisms (220-230, 220'-230', 220"-230") each pair of prisms functions as described above with reference to FIGS. 2A and 2B. It will be appreciated that the delay, repetition rate will increase by a factor of three and the duty cycle will also be increased.

Figure 5:
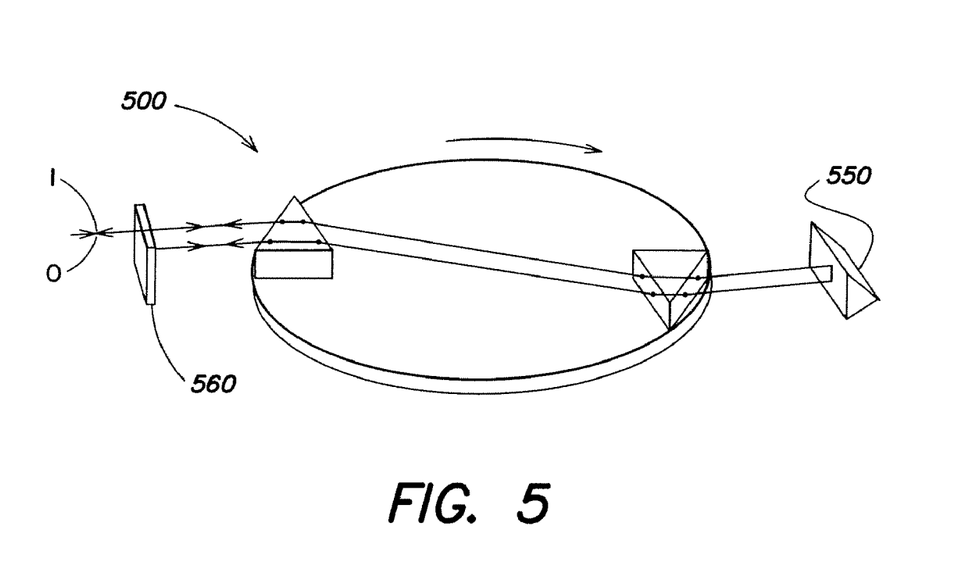
FIG. 5 is a schematic, projection illustration of another embodiment of a delay scanner in which an input beam traverses each prism four times.

FIG. 5 is a schematic illustration of a scanner 500 the same as the delay scanner described with reference to FIGS. 2A and 2B except that the reflective component comprises a roof prism 550. A second reflective component 560 (e.g., a planar reflector) is included to retro-reflect the beam. The roof prism in combination with the planar reflector causes the beam to traverse the prisms four times. The input beam I and the output beam O travel over the top of reflector 260.

Figure 6:
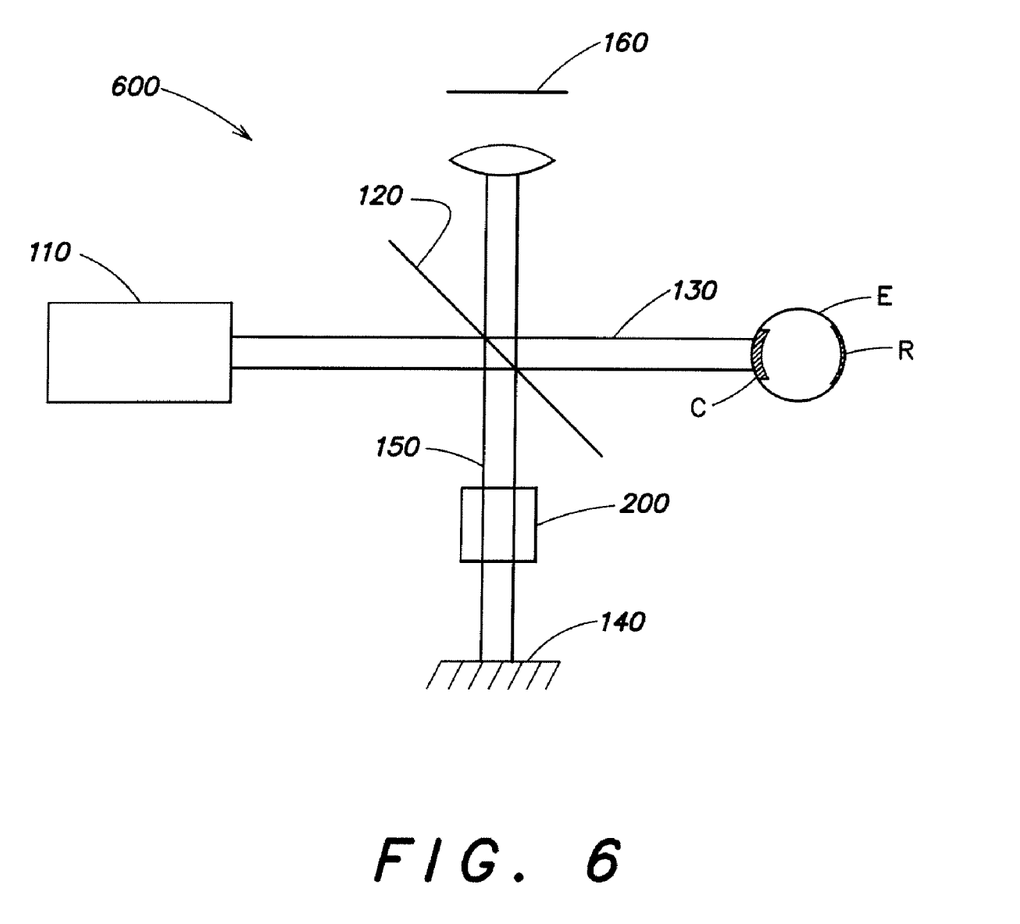
FIG. 6 is a schematic illustration of an example of an embodiment of an eye, axial length measurement apparatus comprising a delay scanner according to aspects of the present invention.

FIG. 6 is an illustration showing a delay scanner 200 in an eye, axial length measurement apparatus 600 according aspects of the present invention. It will be appreciated that the measurement apparatus is configured as a Michaelson interferometer arrangement similar to the interferometer shown in FIG. 1. Although apparatus 600 is shown with a delay scanner 200 as shown in FIG. 2A in its reference arm, any other suitable scanner in accordance with aspects of the present invention may be used (e.g., a delay scanner as shown FIG. 4 or FIG. 5).

For example, when delay scanner is to be used in a reference arm of a Michaleson interferometer, the radiation source may be adapted to produce a beam which is formed of partially coherent light. For example, the coherence length of the light source is less than about 10 microns. It will be appreciated that the coherence length may impact the precision with which the reference arm must be located to achieve interference of light reflected back from the test arm and light reflected back from the reference arm, and thereby impact the precision with which length measurements may be made. For example, the light source may be a superluminescent diode.

Having thus described the inventive concepts and a number of exemplary embodiments, it will be apparent to those skilled in the art that the invention may be implemented in various ways, and that modifications and improvements will readily occur to such persons. Thus, the embodiments are not intended to be limiting and presented by way of example only. The invention is limited only as required by the following claims and equivalents thereto.

What is claimed is:

1. An optical path delay scanner, comprising:
   a rotatable mount;
   a first prism and a second prism disposed on the mount;
   a radiation source aligned to project a beam of light through the first prism and the second prism; and
   a reflective component arranged to reflect the beam back through the first prism and second prism after the beam has passed through the first prism and the second prism.

2. The scanner of claim 1, wherein the mount is adapted to rotate about an axis, and wherein the first prism and the second prism are disposed on the mount such that if the mount is rotated 180 degrees about the axis, the arrangement of the first prism and the second prism is indistinguishable from the positioning prior to the rotation.

3. The scanner of claim 1, wherein the first prism and the second prism are both isosceles prisms.

4. The scanner of claim 1, wherein the first prism and the second prism are substantially identically configured isosceles prisms.

5. The scanner of claim 1, wherein a surface of the first prism is parallel to a surface of the second prism, and wherein the beam passes through both the surface of the first prism and the surface of the second prism.

6. The scanner of claim 1, wherein the radiation source is arranged to project the beam on a surface of the first prism at an incidence angle corresponding to the prism's minimum deviation angle.

7. The scanner of claim 6, wherein the incidence angle of the beam on the surface of the first prism does not depart from the incidence angle corresponding to the minimum deviation by more than +/−25 degrees across the surface as the mount is rotated.

8. The scanner of claim 1, further comprising a third prism and a fourth prism disposed on the mount, the radiation source aligned to project a beam of light through the third prism and the fourth prism when the mount is rotated.

9. The scanner of claim 1, further comprising roof prism and a reflective element configured and arranged to cause the beam to traverse the first prism and the second prism four times.

10. The delay scanner of claim 1, wherein the scanner is disposed in a reference arm of a Michaelson interferometer.

11. A method of providing an optical delay, comprising:
    projecting a beam of light through a first prism and a second prism, while the first prism and the second prism are rotating about a common axis and
    reflecting the beam back through the first prism and second prism after the beam has passed through the first prism and the second prism.

12. The method of claim 11, wherein the first prism and the second prism are both isosceles prisms.

13. The method of claim 11, wherein the first prism and the second prism are substantially identically configured isosceles prisms.

14. The method of claim 11, wherein a surface of the first prism is parallel to a surface of the second prism, and wherein the beam passes through both the surface of the first prism and the surface of the second prism.

15. The scanner of claim 11, wherein the step of projecting comprises projecting the beam on a surface of the first prism at an incidence angle corresponding to the prism's minimum deviation angle.

16. The scanner of claim 15, wherein the step of projecting comprises projecting the beam on the surface of the first prism such that the incidence angle of the beam on the surface does not depart from the incidence angle corresponding to the minimum deviation by more than +/−25 degrees across the surface as the prisms are rotated.

* * * * *